No. 845,084. PATENTED FEB. 26, 1907.
E. M. HEYLMAN.
CULTIVATOR.
APPLICATION FILED DEC. 26, 1905.

Witnesses

Edward M. Heylman, Inventor

By George Wetmore Colles
Attorney

No. 845,084. PATENTED FEB. 26, 1907.
E. M. HEYLMAN.
CULTIVATOR.
APPLICATION FILED DEC. 26, 1905.

Witnesses

Edward M. Heylman, Inventor

By George Letmore Colby
Attorney

No. 845,084. PATENTED FEB. 26, 1907.
E. M. HEYLMAN.
CULTIVATOR.
APPLICATION FILED DEC. 26, 1905.
6 SHEETS—SHEET 6.

Witnesses
Edward M. Heylman, Inventor

By George W. Colles
Attorney

UNITED STATES PATENT OFFICE.

EDWARD M. HEYLMAN, OF JANESVILLE, WISCONSIN, ASSIGNOR TO JANESVILLE MACHINE COMPANY, A CORPORATION OF WISCONSIN.

CULTIVATOR.

No. 845,034.  Specification of Letters Patent.  Patented Feb. 26, 1907.

Application filed December 26, 1905. Serial No. 293,293.

*To all whom it may concern:*

Be it known that I, EDWARD M. HEYLMAN, of Janesville, Wisconsin, have invented a Cultivator, of which the following is a specification.

My present invention relates to cultivators of the wheeled type adapted to be drawn by horses and to be operated either in sitting or walking position.

In this invention I aim to improve on former constructions, first, by providing an improved method of guiding the shovel-gangs, whereby they are held as closely as possible to the growing plants without regard to irregularity in the rows; second, by providing means for simultaneously raising the gangs and throwing back the center of support for the cultivator by the moving of a single handle, thereby preventing the tongue of the cultivator from rising over the horses' necks when the gangs are raised, and, third, by providing improved means for yieldingly supporting the shields which protect the plants from the shovels.

My invention also embodies an improved articulation between the shovel-gangs and the frame, which can be constructed more cheaply than in previous forms, while offering superior advantages and facilities for adjustment, and secondary constructions and combinations, which will be more particularly described hereinafter and embodied in the claims.

In the accompanying drawings in illustration of my invention.

In these drawings every part is always designated by the same reference letter or numeral, and certain accessory parts which are common in cultivators and form no part of my present invention are omitted for the sake of clearness.

Figure 3:
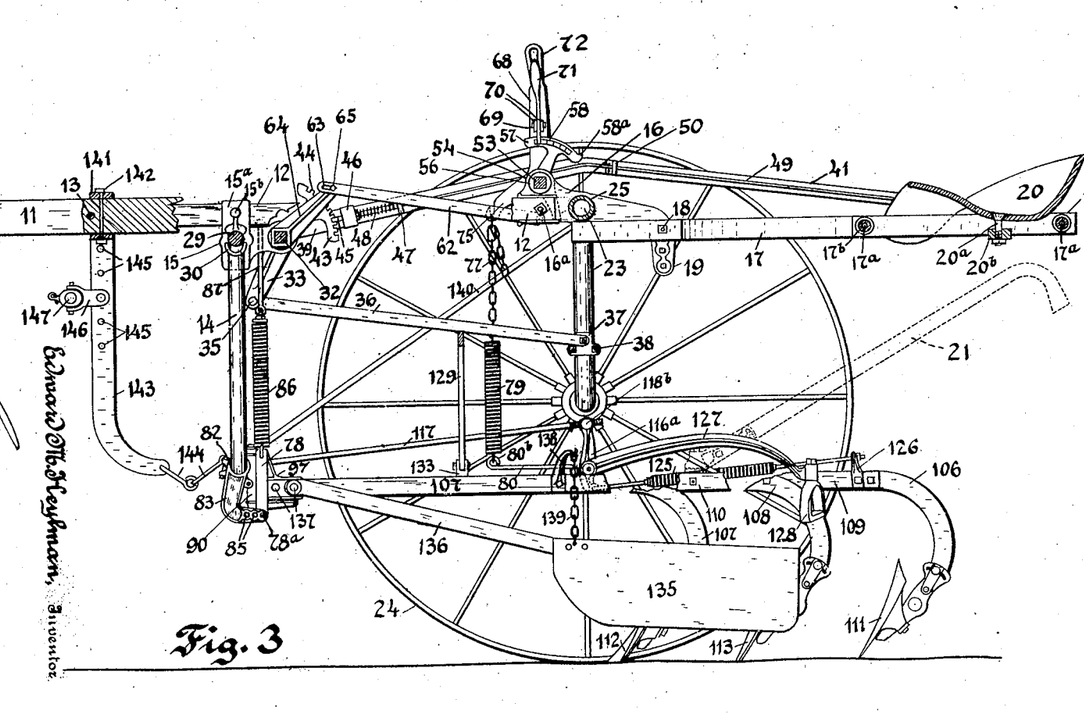
Fig. 3 is a sectional elevation on a longitudinal plane through the machine.

The frame of the apparatus comprises the draft-pole 11, a pair of longitudinal frame-bars 12 on opposite sides thereof spaced apart, as shown, and having their forward ends brought together and bolted to the sides of the pole, as shown at 13, a main arch 14, which is secured to the pole by a U-bolt 11ª at the center and to the longitudinal bars 12 by means of castings 15, and hub-castings 16, secured by bolts 16ª to the rear ends of the longitudinal bars. To these parts may be added the seat-frame, composed of a pair of longitudinal bars 17, which are pivoted on bolts 18, supported in downwardly and rearwardly extending legs 19, projecting from the castings 16, the bars 17 being bent parallel to one another at their rear ends and secured together by bolts 17ª, carrying spacing-sleeves 17ᵇ. Between the bolts 17ª is secured the seat 20 by means of a bolt 20ª and a cross-block 20ᵇ. The seat-frame turns about the pivot-bolts 18, so that it may be thrown upwardly and forwardly when out of use—that is, when the machine is being used for a hand-cultivator, in which case handles 21 (shown in dotted lines in Fig. 3) may be attached to the shovel-gangs for guiding them; but this arrangement forms no part of my present invention.

The castings 16 have hubs 22, in which are pivoted cranked axles 23, which latter carry on their ends the wheels 24, the ends of the axles 23 passing through the hubs 22 and being connected by a tubular spacing-piece 25, receiving these ends. As will be seen from Figs. 5, 11, 12, 13, and 16, the interior of the hubs 22 is cored out to a diameter to receive the ends of the spacing-piece 25, and the hub is split longitudinally on the inner side, as shown at $22^a$, Figs. 4 and 16, and is provided with lugs $22^b$, which receive a square-shank clamping-bolt $22^c$, which serves to clamp the spacer 25 rigidly in the hub, and thus hold the two sides of the frame together. The ends of the axles 23 project into the end of the piece 25 and oscillate therein, being supported on the outer end of the hubs 22 by a semi-annular lug 27, which is formed, as shown, by an inwardly-turned flange or bead on the upper half of the hub 22, which projects a sufficient distance beyond the lower half thereof to admit a collar 26 under the lug 27. The collar is secured rigidly in place on the axle 23 by a set-screw $26^a$. The spacing of the wheels may be adjusted by properly setting the set-screw $26^a$ on the axle 23, the latter being pushed into the hub 22 to the proper distance.

Figure 1:
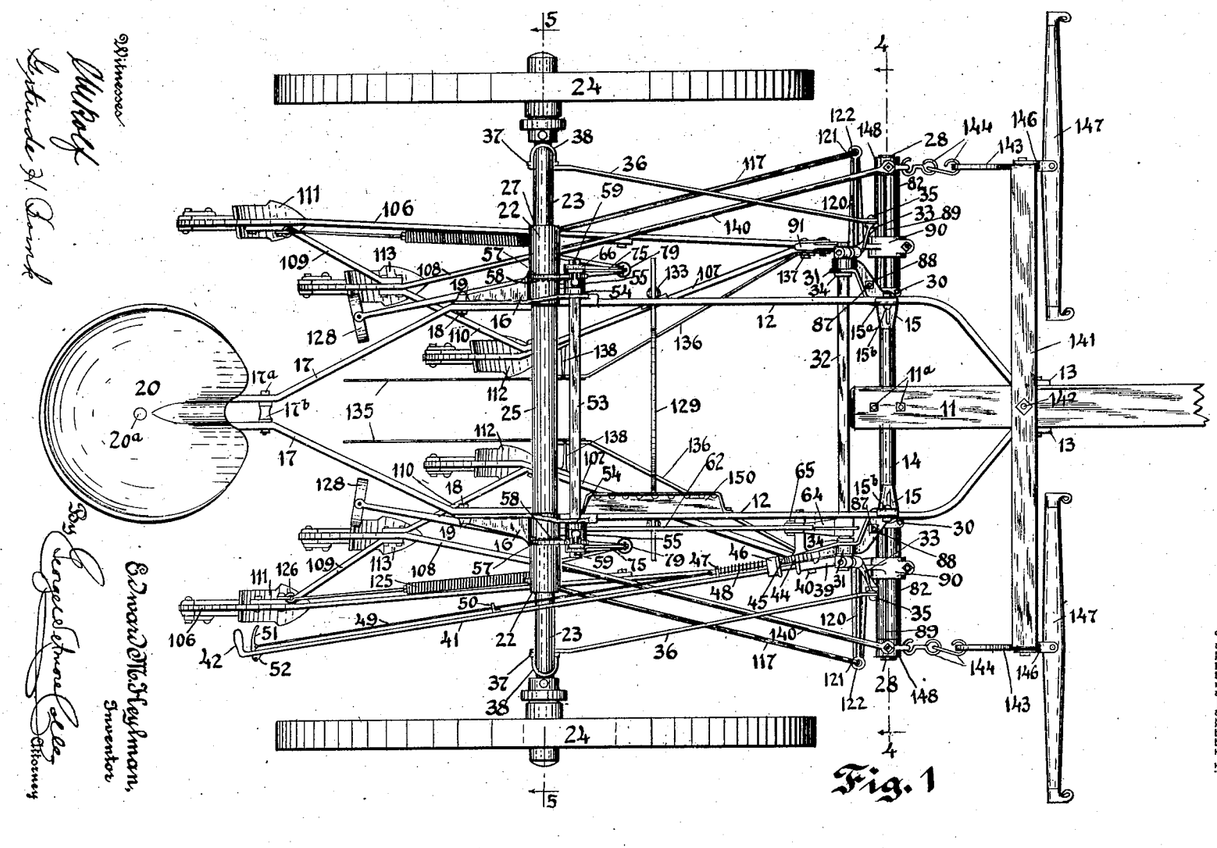
Figure 1 is a plan view.
Figure 2:
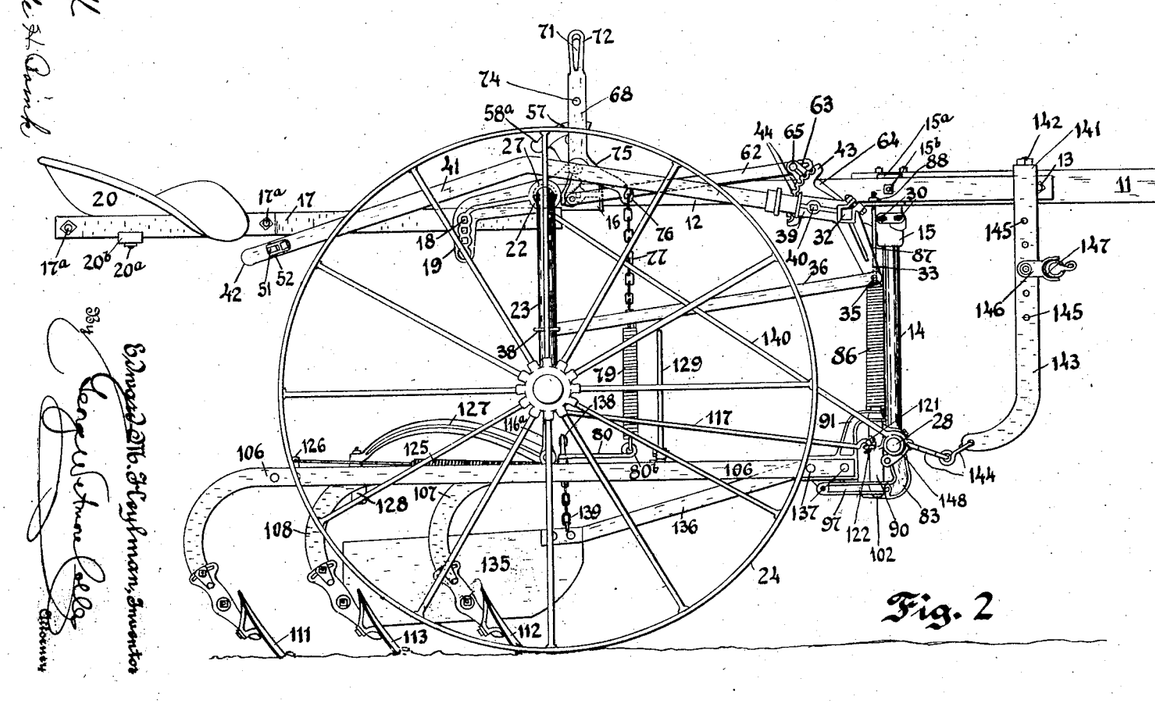
Fig. 2 is a side view from the right.
Figure 4:
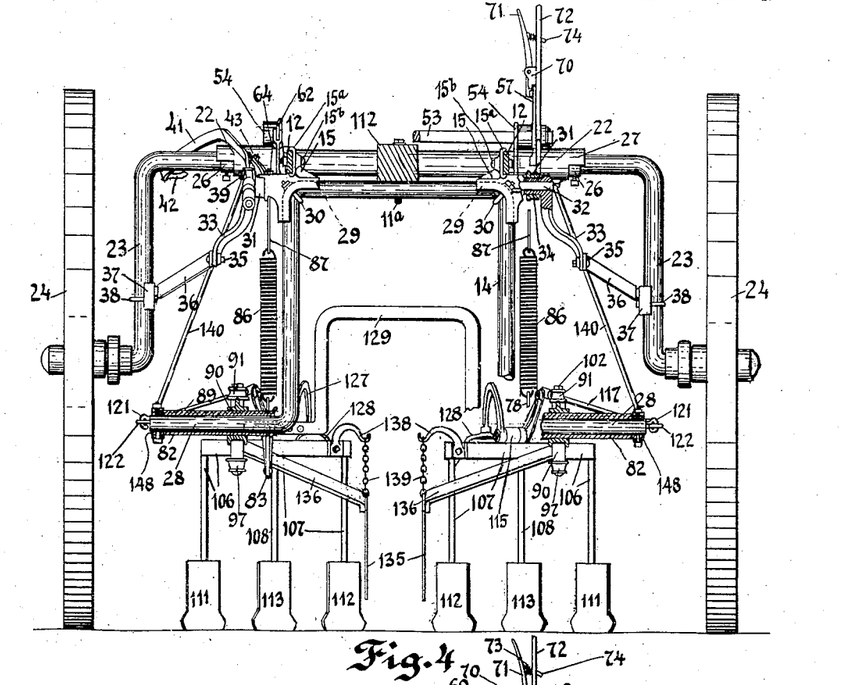
Fig. 4 is a transverse section through the main arch of the machine—that is, on the line 4 of Fig. 1 looking to the rear—a part being sectioned on the axis of the front operating-shaft. The seat and seat-frame and the right-hand end of the rear operating-shaft, with the mechanism carried thereby, are here omitted for clearness sake.

The main arch 14 is horizontal along its top and is bent rectangularly downward at each side, and its extremities are bent rectangularly outward to form axle-arms 28, all as clearly shown in Fig. 4. The castings 15 have knee-sockets 29, receiving the angles of the main arch, and are secured thereto by means of U-bolts 30. Each casting 15 has further a grooved lug $15^a$ on its upper side receiving the longitudinal bar 12, which is secured in place therein by a bolt $15^b$. Each piece 15 has also a hub 31, in which rotates a square shaft or axle 32, passing across the front of the machine parallel to the main arch and just behind the same. This axle being of rectangular section is not journaled directly in the hubs 31; but it has clamped to each end a downwardly-extending rock-arm 33, which carries a journal-boss 34, turning within the hub 31, as shown in Fig. 1, and on the right of Fig. 4. To each rock-arm 33 is connected at its lower end by a pivot-bolt 35 a link 36, whose other end is connected with a pivot-piece 37, clamped to the vertical portion of the axle 23 by a U-bolt 38. It will be understood that this link connection is present on both sides of the machine, whereby both axles are turned simultaneously when the shaft 32 is rotated. The rock-arm 33 on the right, however, differs from that on the left in having a socket-piece 39 thereon, either cast integral therewith or secured separately to the shaft 32, and in this socket is fixed, by means of a set-screw 40, the end of a bent lever 41, which extends backwardly over the axle 23 and has on its rear end a handle 42 in position to be operated from the seat 20. It will be observed that by raising and lowering the handle 42 the linkwork is operated, whereby the axles 23 are swung backwardly or forwardly, thus moving correspondingly the center of support of the entire machine.

In order to hold the lever 41 in any desired fixed position, there is mounted on the right-hand casting 15 a sector 43, which is notched on the margin, as shown at 44, and in the notches thereof engages a bolt 45, which slides in an eye 46 and a perforated lug 47 and has mounted thereon a coiled compression-spring 48 for the purpose of holding the bolt normally pushed forward in engagement with the teeth 44. To the rear end of the bolt 45 is connected a rod 49 at the side of the lever 41 and supported midway in a perforated guide 50, while its other end is articulated with a finger-lever 51, pivoted at 52 on the lever 41, said finger-lever 51 being arranged in proximity to the handle 42, whereby the two may be grasped simultaneously to withdraw the bolt 45 and enable the lever 41 to be raised or lowered.

Figures 11, 12, 13, 14, 15, 16, 17, 18:
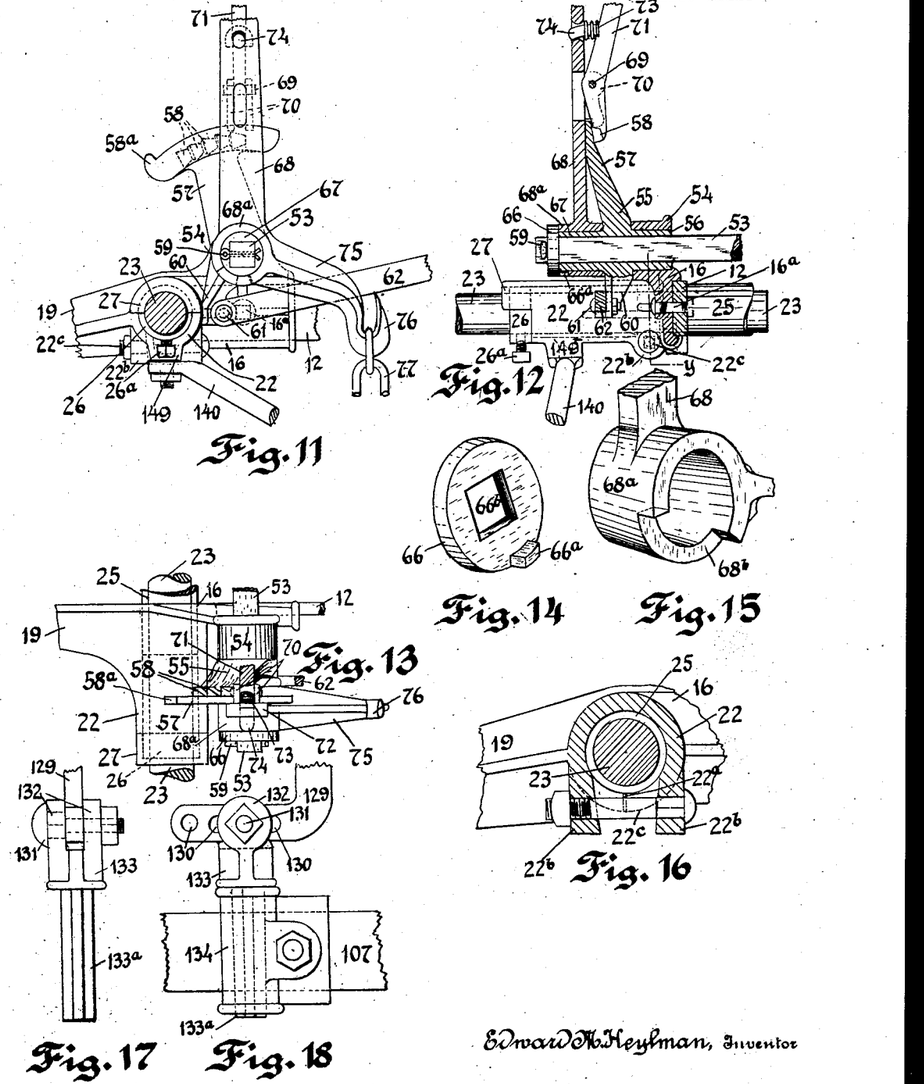
Fig. 11 is a side elevation, on a large scale, of the details of the gang raising and adjusting mechanism.
Fig. 12 is a vertical section of the same through the axis of the rear operating-shaft.
Fig. 13 is a plan view of the same.
Fig. 14 is a perspective view of the washer on the end of the transverse operating-shaft.
Fig. 15 is a perspective view of the hub of the hand-lever.
Fig. 16 is a transverse section through the rear frame-casting on the line $y$ of Fig. 12.
Figs. 17 and 18 are side views at right angles to one another of the swivel-pin for the spreader, the latter view showing it in place in the socket.

Just in front of the axles 23 and near the tubular spacer 25 is mounted a transverse square shaft 53, which is mounted in bearing-lugs 54, formed on the castings 16, and journaled therein in a similar manner in which the square shaft 32 is journaled—to wit, on the ends of the square shaft 53—are mounted pieces 55, having each a square socket for receiving the shaft (see Figs. 11 and 12) and a journal-boss 56, turning in the bearing-lug 54. Each piece 55 carries a sector-shaped rock-arm 57, which has ratchet-teeth 58 on its inner face, these ratchet-teeth pointing backwardly, as shown in Fig. 13. The pieces 55 are provided, further, each with a downwardly-extending arm 60, whose rear face is flattened to form an abutment against the axle-hub 22 for limiting the swing of the shaft 53 and the parts mounted thereon in a forward direction—that is, when the shovel-gangs are in their lowest position. The arm 60 on the right differs from that on the left in carrying at the front side thereof a pivot-bolt 61 for one end of a link 62, whose other end has a slot 63 formed therein, in which slides a pin 65 on the end of a rock-arm 64, which is clamped to the square shaft 32 on the right-hand side thereof just inside the hub 31.

Figure 5:
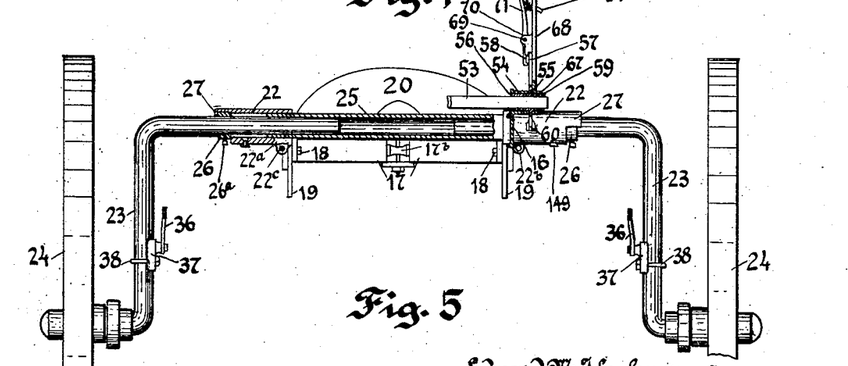
Fig. 5 is a transverse sectional elevation through the axis of the wheels—that is, on the line 5, Fig. 1, looking to the rear.

The pieces 55 have each on the outer side thereof a projecting pivot-boss 67, on which is pivotally mounted a hand-lever 68, projecting upwardly and having just above the sector-arm 57 a pair of pivot-lugs 70, which, as shown in Figs. 4 and 5, hook over the edge of the sector-arm, thus holding the lever 68 in proper relation thereto. In the pivot-lug 70 is mounted a pin 69, on which oscillates a finger-lever 71, the upper end or handle whereof is in proximity to the handle 72 of the lever 68, and its lower end engages with the teeth 58 on the inner side of the sector-arm 57. Above the pivot 69 the lever 71 has a guide post or projection 74, which passes through a hole in the lever 68, and said post has coiled around it a spring 73, which being under compression acts to hold the lever 71 away from the handle 72 and the lower end thereof in engagement with the teeth 58.

Figure 9:
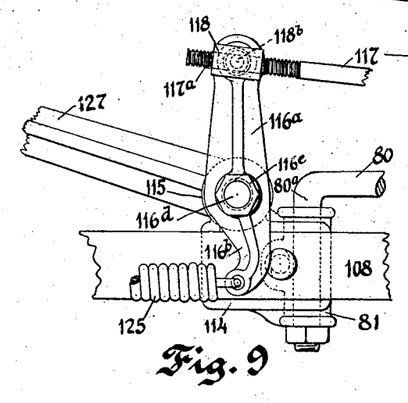
Fig. 9 is a side view of the treadle guide mechanism on an enlarged scale.
Figure 10:
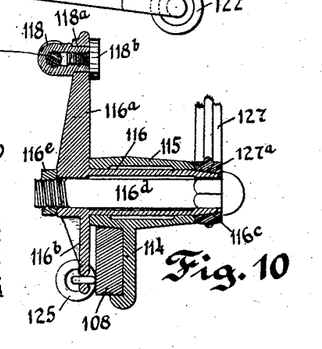
Fig. 10 is a vertical sectional elevation through the shaft thereof.

The sector-arm 57 is provided with a snug 58$^a$ at one end thereof, which forms an abutment for the lugs 70 to prevent the lever 68 from being turned so far back as to run off the sector-arm, and a similar lug might be provided in the opposite end but for the fact that it would then be impossible to assemble the parts together, since the lugs 70 hook over the inner edge of the sector-arm. I therefore may provide other means for limiting the swing of the lever 68 in a forward direction, consisting of a washer or plate 66, mounted on the end of the shaft 53 and having a snug 66$^a$ projecting from its inner side, said washer having a central square aperture 66$^b$, which fits the shaft to prevent the washer from turning thereon. The outer margin of the hub 68$^a$ of the lever 68, as best shown in Fig. 15, is notched out at 68$^b$ through an arc whose length is such that the ends of said notch abut against the snug 66$^a$ when the lever 68 is in its two extreme positions on the respective ends of the sector-arm 57. The shaft 53 projects beyond the washer 66 far enough to admit a linchpin 59 in a hole on the end thereof, which holds the shaft 53 and the parts carried thereby in place. Each hand-lever 68 has a forwardly-projecting arm 75, provided with a hook 76 on its end engaging one of the links of a chain 77, whose lower end is connected with the corresponding shovel-gang through the medium of a spring 79, and a horizontally-projecting arm 80, which, as best seen from Fig. 9, has one end 80$^a$ bent downwardly and turning in a socket 81, secured on one of the frame-bars of the shovel-gang, and the other end of the bar 80 is provided with an eye 80$^b$, with which is connected the lower end of the spring 79. The object of the pivoted member 80 is to enable the shovel-gang to swing from side to side without being sensibly raised or increasing the extension of the spring 79, which would happen if the latter were connected directly to the shovel-gang.

Each shovel-gang consists of three longitudinal frame-bars 106 107 108, which diverge rearwardly, the bars 106 and 107 being secured together at their front ends to the universal joint, as will be described later, and the bar 108 being secured to the side of the bar 106. At their rear ends these bars are secured together at their proper spacing by braces 109 and 110. Each longitudinal bar is curved downwardly at the rear end, as shown, and has secured thereto a shovel or share of any approved form, (herein designated 111, 112, and 113.)

The universal joint or articulation by which the shovel-gangs are connected with the machine-frame provides means whereby the shovel-gangs may be oscillated vertically about a horizontal pivot and swung laterally about a vertical pivot. While former cultivators have been provided with a joint permitting of these movements, the joint or articulation herein shown is of a novel and improved form and constitutes an important element of my invention.

Figures 6, 7, 8:
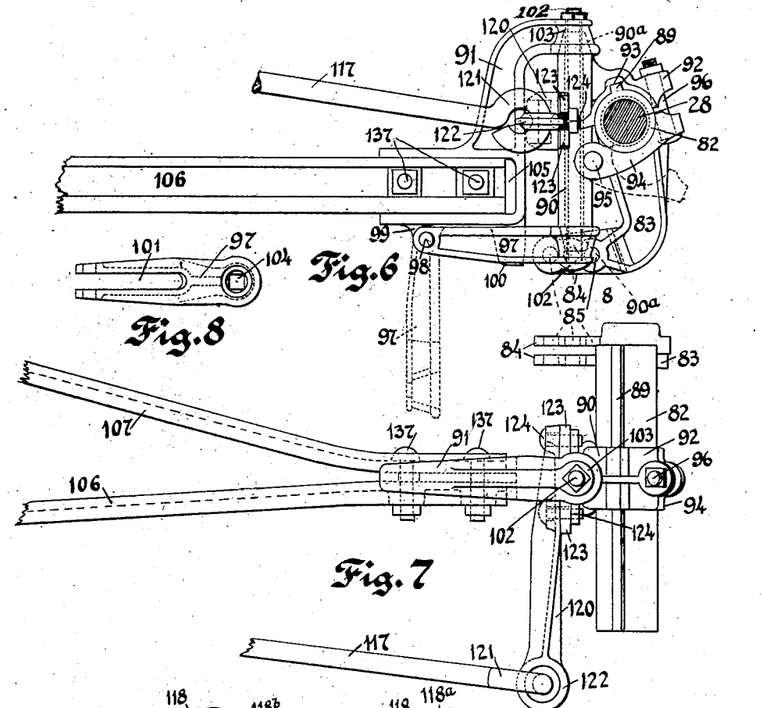
Figs. 6 and 7 are respectively a side elevation and a plan view of my improved articulation for the shovel-gangs.
Fig. 8 is a reverse plan view of the hinged pivot-bearing thereof.

On each of the axle-arms 28 of the main arch 14 is mounted a sleeve 82, which turns loosely thereon and has at its inner end a depending angle-arm 83, whose lower end 84 is bent at right angles in a horizontal direction and is forked to receive the eye of a spring-rod 78, and is provided with a number of holes 85 to receive a pin connection 78$^a$ therefor. The spring-rod 78 connects the angle-arm 83 with a coiled counterbalance-spring 86, whose upper end is connected to a rod 87, whose upper end passes through a hole in the casting 15 and is threaded to receive a nut 88. The spring 86 tends to turn the sleeve 82 in a direction so as to raise the shovel-gang which is mounted thereon, it being understood that the tension of the spring is not quite sufficient in itself to raise the shovel-gang, but takes a greater part of the weight thereof, so as to make it easier to raise and lower the same, while the tension of the spring may be adjusted by screwing up the nut 88 on the bolt 87 to the proper extent. The sleeve 82 has a longitudinal spline 89, and on this sleeve is clamped one member of the pivot-joint composed of two members 90 and 91. (See Figs. 6, 7, and 8.) The member 90 has a fixed jaw 92, which is grooved at 93 to receive the spline 89, and a pivoted jaw 94, turning about a pin 95, which is mounted in a lug on the piece 90 and coöperating with the jaw 92 to clamp the member 90 in any position on the sleeve 82, a bolt 96 being used for this purpose. The member 90 comprises, as shown, an upright tube coned at the ends 90$^a$, which enter corresponding sockets in the upper end of the piece 91, and a pivoted piece 97, which turns about a bolt 98, mounted in a lug 99 on the piece 91, and is held against lateral motion by a tongue 100, which projects into a longitudinal slot 101 of the piece 97. A bolt 102 passes through the tubular member 90 and through holes 103 and 104 in the coned ends of the pieces 91 and 97, respectively, and thus secures the joint together firmly, yet in a manner to allow the piece 91 to oscillate about the piece 90 as an axis. The hole 104, as shown in Fig. 8, is squared to receive the square mortised head of the bolt 102 and prevents it from turning relative to the pieces 91 and 97. The form of articulation thus described offers advantages over the form previously used both in the ease of construction and of adjustment and in the manner of removing and replacing the same, because the gang can be disconnected by withdrawing either the bolt 96 or the bolt 102 and withdrawn from the machine without disturbing any other parts of the apparatus.

The piece 91 has on opposite sides thereof recesses or sockets 105, which receive the ends of the longitudinal bars 106 107, which form the front end of the gang-frame and are secured to the casting 91 by bolts 137.

On each of the longitudinal bars 108 of the shovel-gangs is mounted a piece 114, which carries a bearing-hub 115, in which oscillates a short hollow shaft 116, carrying on the outer end thereof an upwardly-extending rock-arm $116^a$ and a downwardly-extending rock-arm $116^b$. The shaft 116 projects beyond the bearing-hub 115 on the inner end and has a squared taper end $116^c$, over which fits the taper hub $127^a$ of a treadle-lever 127, which extends rearwardly and carries on its end a treadle or stirrup 128 in position to be actuated by the foot of the operator sitting on the seat 20. The taper hub $127^a$ is drawn tightly over the taper end $116^c$ by means of a bolt $116^d$, passing through the tubular shaft 116 and having a nut $116^e$ on the threaded end thereof. The upwardly-extending arm $116^a$ carries a pivot-nut 118, which turns in an eye $118^a$ in the end of the arm $116^a$ and is secured therein by means of a cap-screw $118^b$. The nut 118 engages threads $117^a$ on the end of a rod 117, which has on its other end an eye 121, engaging an eye 122 on the end of a laterally-extending bracket 120, which is secured to flange-lugs 123 on the piece 90 by means of bolts 124. The effective length of the rod 117 may be adjusted by removing the pivot-nut 118 from its socket in the piece $116^a$ and screwing it to the proper position on the rod 117.

To the arm $116^b$ is connected a retractile coiled spring 125 under tension, whose rear end is secured to a bracket 126, bolted to the gang-frame at the rear end thereon in such manner that the tension of the spring acts to throw the arm $116^a$ forwardly, and thereby to swing the gang-frame inwardly.

When the hand-lever 41 is raised, it will be seen that the square shaft 32 is oscillated, the depending arms 33 oscillated backwardly, and the wheels 24 thrust slightly to the rear by the link connection 36, so as to move the center of support rearwardly. At the same time the rock-arm 64 strikes the end of the slot 63 of the link 62 and draws the latter forward, thus turning the member 55 on the right, and through it the square shaft 53 and the member 55 on the opposite side. The turning of the members 55 causes in like manner the two hand-levers 68 to be thrown back and the hook 76 to be raised, which action, by means of the connections 77, 79, and 80, raises the respective gang-frames, and in this action the counterbalancing-spring 86 assists, because the gang-frames turn solidly with the sleeves 82 about the axle-arms 28 of the main arch. By reason of the slot 63 the rearward motion of the wheels takes place in part before the raising of the gangs begins, and thus the weight of the latter is not brought upon the frame until the center of support has been shifted, and there is consequently no tendency of the pole 11 to be thrown up above the horses' necks. It should also be remembered that in this position the wheel center is slightly behind the center of the hubs 22, so that the lever 41 tends to be thrown up and requires to be pulled down in order to lower the gangs, while when the gangs are lowered the wheel center is slightly in advance of the center of the hubs 22, and the reaction tends, therefore, to throw the lever 41 downward, and thus it will be seen that the force exerted upon the lever 41 is always in the direction of easiest exertion by the driver—to wit, in the direction of pulling upward when the lever is in its lowest position and pulling downwardly when the lever is in its raised position.

The shovel-gangs are guided laterally by means of the treadles 128, for it will be seen that pressure upon one of these treadles causes the arm $116^a$ to oscillate to the rear, and this draws the gang-frame laterally toward the wheel 24, the frame in this case turning about the vertical pivot-bolt 102, and when pressure upon the treadle 128 is removed the retractile spring 125 draws the gang-frame back toward the center again.

This construction is superior to old forms not only in the fact that a lateral movement of the treadle is produced by a vertical movement of the foot, which is easiest for the operator to exert, but also in the fact that the link 117 is independent of the axle-arm 28, consequently is removed from the axle-arm along with the shovel-gang by removing the bolt 96, and when the position of the piece 90 is movably adjusted upon the sleeve 82 the link 117 does not require separate adjustment, as is the case in a former construction.

If it be desired to hold the two shovel-gangs at a uniform distance from each other, I employ a spreader or gage comprising an arched bar 129, having a plurality of holes 130 in its ends, in one of which may be connected a pivot-bolt 131, which passes through the forked end 132 of a swivel-pin 133, which latter has a shank $133^a$ fitting in a socket-piece 134, secured to one of the longitudinal bars of the gang-frame. When the spreader is in place, the two gang-frames are held at a uniform distance, and their position is governed by simultaneous pressure upon both treadles 128, excess of pressure on one causing the gangs to swing in one direction and excess of pressure on the other causing the gangs to swing in the other direction.

In my improved cultivator I employ a shield 135, having arms 136, pivoted on one of the bolts 137, which connect the gang-frame to the piece 91, and an overhung bracket 138 on the gang-frame forms a point of support for a chain 139 or other flexible connection connected to a point on the shield.

A pair of brace-bars 140 are preferably arranged to connect the outer ends of the axle-arms 28 with the castings 16 for rigidity's sake, being secured at one end to collars 148 on the former (which also hold the sleeves 82 in place) and at the other to lugs 149 on the under side of the castings 16. (See Fig. 11.)

There is herein shown also a draft mechanism, consisting of an arched equalizer 141, pivoted to the tongue by a bolt 142 and having vertically-depending arms 143, whose lower ends are connected to the collars 148 on the outer ends of the axle-arms 28 by links 144, said depending ends 143 having holes 145, in any of which may be connected the clevises 146, which form the means for attachment of the whiffletrees 147. This draft mechanism, however, does not form a part of my present invention. A trough or receptacle 150 is secured to the inner side of one of the longitudinal frame-bars 12 for holding tools.

It is to be distinctly understood that I do not consider my invention confined to the use of all the various features above described nor to the specific forms of construction herein shown, but that some of said features may be omitted and others modified in various ways, as will be readily understood by those skilled in the art.

Having thus described my invention, what I claim as new, and desire to secure by Letters Patent, is—

1. A machine of the cultivator type comprising a framework, a pair of cranked axles pivoted on said framework, a pair of wheels carried by said cranked axles, a pair of shovel-gangs pivoted on said framework, a lever connected with said cranked axles and shovel-gangs whereby all are moved simultaneously upon operation of said lever, and means for independently adjusting each of said shovel-gangs.

2. A machine of the cultivator type comprising a frame, a transverse shaft journaled therein, lever-arms on said transverse shaft, a pair of cranked axles pivotally mounted on said frame, wheels carried by said cranked axles, connections between said lever-arms and the respective axles, a pair of shovel-gangs mounted to oscillate in vertical planes on opposite sides of the machine, a second transverse shaft, a connection between said last-named shaft and said first-named shaft whereby the oscillation of the first causes the oscillation of the second, a connection between said second shaft and said shovel-gangs whereby its oscillation causes said shovel-gangs to be raised, and means for oscillating said first-named shaft.

3. In a machine of the cultivator type, the combination of a frame, a transverse shaft mounted thereon, a pair of cranked axles pivoted on said frame, a pair of wheels pivotally mounted on said cranked axles, operative connections between said cranked axles and said transverse shaft whereby said axles are moved longitudinally to shift the center of support, a pair of shovel-gangs pivoted on said frame, a second transverse shaft, a pair of lever-arms mounted on said second shaft and connected with said shovel-gangs whereby to raise the gangs when the said shaft is oscillated, and a link pivoted at one end to said second transverse shaft and connected with the other by a slot-and-pin connection; and means for rotating said first-named shaft whereby the wheels are first shifted longitudinally and thereafter said shovel-gangs are raised.

4. In a machine of the cultivator type, the combination of a pair of shovel-gangs, a transverse shaft, means for rotating said transverse shaft, a pair of members journaled on said shaft and adapted to be fixed in various positions thereon, and connections between said members and the respective shovel-gangs whereby the height of each shovel-gang may be adjusted independently of the movement of said shaft.

5. In a machine of the cultivator type, the combination of a transverse shaft, a pair of members fixed to the ends thereof and having sector-arms, said sector-arms being provided with teeth, a pair of hand-levers pivoted on said shaft and having means for engaging said teeth and a pair of laterally-extending arms, a pair of shovel-gangs, and a connection between each shovel-gang and one of said laterally-extending arms whereby the height of each shovel-gang may be independently adjusted while both are simultaneously raised and lowered by the oscillations of said shaft.

6. A machine of the cultivator type comprising a framework, a transverse shaft mounted to oscillate at the front thereof, a hand-lever secured to said shaft to oscillate it, a pair of cranked axles, a pair of wheels mounted thereon, a pair of downwardly-extending arms mounted on said shaft, links connecting the respective arms with the respective axles, a second transverse shaft at the rear of the machine, a pair of shovel-gangs, a pair of rock-arms mounted on said second shaft and connected with said second shaft and with said shovel-gangs to raise and lower the latter when said second shaft is oscillated, and a link connecting the two shafts and having a certain amount of lost motion between them whereby the oscillation of said lever causes first the longitudinal movement of said wheels and second the raising movement of said shovel-gangs.

7. In a cultivator, the combination of a shovel-gang pivoted at and trailing from a point at the forward end thereof so as to swing laterally, a treadle mounted thereon to oscillate vertically, and a connection between said treadle and said shovel-gang to swing the latter laterally when the treadle is moved vertically.

8. In a machine of the cultivator type, a shovel-gang mounted to swing laterally, a treadle having a vertical movement, a connection between said treadle and said shovel-gang whereby the latter is swung laterally when the former is depressed vertically, and a spring acting against said treadle to reverse the movement of said shovel-gang when the treadle is released.

9. In a machine of the cultivator type, the combination of a shovel-gang mounted to swing laterally, a rock-shaft mounted thereon, a treadle-arm mounted on said rock-shaft and carrying a treadle, and a connection between said rock-shaft and a fixed part of the framework whereby the oscillation of said shaft causes said shovel-gang to swing laterally.

10. In a machine of the cultivator type, the combination of a shovel-gang mounted to swing laterally, an oscillating shaft mounted thereon, a treadle-lever carried thereby, a treadle mounted on said treadle-lever and having a vertical movement, a spring connected with said oscillating shaft and acting against the depression of said treadle, and a connection between said oscillating shaft and a fixed part of the apparatus whereby said shovel-gang is swung laterally by the depression of said treadle.

11. In a machine of the cultivator type, the combination of a pair of shovel-gangs having lateral swinging movements, a pair of treadles having vertical movements, connections between said treadles and said shovel-gangs whereby the depression of the treadles causes the lateral swinging of the gangs, and springs acting in opposition to said treadles.

12. In a machine of the cultivator type, the combination of a pair of shovel-gangs having lateral swinging movements, a pair of treadles having vertical movements, connections between said treadles and said shovel-gangs whereby the depression of the treadles causes the lateral swinging of the gangs, and a spreader maintaining said shovel-gangs at a uniform distance apart.

13. In a machine of the cultivator type, in combination with a pair of laterally-swinging shovel-gangs having sockets, a spreader comprising an arched bar, and a pair of swivel-pins turning in said sockets and having an adjustable connection with the ends of said bar.

14. In a machine of the cultivator type, the combination of a laterally-swinging shovel-gang, an oscillating shaft mounted thereon, a rock-arm mounted on said shaft, and an adjustable connection between said rock-arm and a stationary point of the apparatus, said connection consisting of a rod having one end threaded and a nut mounted thereon and pivotally connected with said rock-arm; and means for operating said shaft whereby said shovel-gang is swung laterally.

15. In a machine of the cultivator type, in combination with an axle-arm and a shovel-gang, an articulation between said axle-arm and shovel-gang comprising a sleeve rotatably mounted on said axle-arm, a member 90 having a hinged jaw 94 whereby it is adjustably clamped to said sleeve, a member 91 vertically pivoted to said member 90 and secured to the end of said shovel-gang, a lever-arm mounted on said sleeve, and a counterbalancing-spring connecting said lever-arm with a fixed part of the apparatus to take a certain portion of the weight of said shovel-gang.

16. In a machine of the cultivator type, in combination with an axle-arm and a shovel-gang pivoted thereto, an articulation comprising a member 90 mounted to oscillate about said axle-arm, a member 91 articulated to said member 90 on a vertical pivot, a laterally-extending bracket-arm connected to said member 90, a link connected to the end of said bracket, and a connection between said shovel-gang and link whereby the end of said link may be moved longitudinally with respect to said shovel-gang, thus swinging the latter laterally.

17. In a machine of the cultivator type, in combination with an axle-arm and a shovel-gang, universal-joint members comprising a tubular member 90 mounted to oscillate about said axle-arm and having its ends coned, a member 91 having a coned socket fitting over one of said coned ends, a member 97 pivoted to said member 91 and having a second coned socket receiving the other coned end, said member 91 being secured to the end of said shovel-gang, and a pivot-bolt passing through said member 90 and securing said members 97 and 91 thereto.

18. In a machine of the cultivator type, the combination of a horizontal axle-arm and a shovel-gang, a sleeve mounted to oscillate thereon and having a spline, a pivot member 90 having clamping-jaws, one of which is grooved to receive said spline, one of said jaws being fixed and the other pivoted to said member 90, and a member 91 pivoted on a vertical axis to said member 90 and secured to the end of said shovel-gang.

19. A machine of the cultivator type comprising a pair of longitudinal frame-bars, a transverse main arch at the front of the machine, a pair of members 15 connecting the upper corners of the main arch with the respective frame-bars, said members 15 having hubs and one of said members carrying a notched sector, a transverse shaft journaled in said hubs, a pair of downwardly-extending arms 33 mounted on the ends of said shaft, a pair of members 16 secured to the rear ends of said longitudinal bars and having hubs 22, a pair of cranked axles mounted to oscillate in said hubs 22, a pair of wheels on the respective axles, a pair of links connecting the respective arms 33 to the respective cranked axles, a lever mounted on said transverse shaft to operate the same, a retractile bolt mounted on said lever and normally engaging one of the notches of said sector, and a finger-lever mounted on said lever and connected with said bolt to retract the same.

20. A machine of the cultivator type comprising a frame, a pair of shovel-gangs articulated thereto, a transverse shaft, a pair of lever-arms mounted thereon, connections between said lever-arms and the respective shovel-gangs whereby the oscillation of said shaft raises or lowers said shovel-gangs, a stop to limit the downward motion of said shaft, a pair of longitudinally-shiftable wheels supporting said frame, a hand-lever operatively connected with the axles of said wheels to shift them longitudinally, and a connection between said hand-lever and transverse shaft whereby said shaft is oscillated to raise the shovel-gangs after a certain movement of the lever.

21. A machine of the cultivator type comprising a frame, a pair of shovel-gangs articulated thereto, a transverse shaft, a pair of lever-arms mounted thereon, connections between said lever-arms and the respective shovel-gangs whereby the oscillation of said shaft raises or lowers said shovel-gangs, a stop to limit the lowering motion of said shaft, a pair of wheels mounted on longitudinally-shiftable axles supporting said frame, a hand-lever operatively connected with the axles of said wheels to shift them longitudinally, and a connection between said lever and shaft to oscillate the latter but permitting the lever to move beyond the limit of movement of said shaft, whereby one movement of said lever causes the wheels to be shifted before the shovel-gangs are raised and the opposite movement causes the wheels to be shifted after the shovel-gangs are lowered.

22. A machine of the cultivator type comprising a frame, a pair of shovel-gangs articulated thereto and resting on the ground when in use, a transverse shaft, connections between said shaft and shovel-gangs to raise or lower them when said shaft is oscillated, a pair of longitudinally-shiftable wheels mounted on said frame, a lever, a link connecting said lever directly with the axis of said wheels to shift them, and an independent connection between said lever and shaft whereby said gangs are raised when said lever is operated to shift the wheels rearwardly and vice versa.

23. A machine of the cultivator type comprising a frame, a pair of shovel-gangs articulated thereto and resting on the ground when in use, a transverse shaft, connections between said shaft and shovel-gangs to raise or lower them when said shaft is oscillated, a pair of longitudinally-shiftable wheels mounted on said frame, a lever operatively connected with the axles of said wheels to shift them, a connection between said lever and shaft whereby said gangs are raised when said lever is operated to shift the wheels rearwardly and vice versa, and a stop limiting the lowering movement of said shovel-gangs but not interfering with the further movement of said wheels.

24. A machine of the cultivator type comprising a frame, a pair of shovel-gangs articulated thereto, a transverse shaft, a pair of lever-arms mounted thereon, connections between said lever-arms and the respective shovel-gangs whereby the oscillation of said shaft raises or lowers said shovel-gangs, a stop to limit the lowering motion of said shaft, a pair of longitudinally-movable wheels supporting said frame, a hand-lever operatively connected with the axles of said wheels to shift them longitudinally, a connection between said hand-lever and transverse shaft whereby said shaft is oscillated to raise the shovel-gangs after a certain movement of the lever, and means for independently adjusting the lower limit of movement of the shovel-gangs.

25. A machine of the cultivator type comprising a frame, a pair of shovel-gangs articulated thereto, a transverse shaft, a pair of lever-arms mounted thereon, connections between said lever-arms and the respective shovel-gangs whereby the oscillation of said shaft raises or lowers said shovel-gangs, a stop to limit the lowering motion of said shaft, a pair of longitudinally-shiftable wheels supporting said frame, a hand-lever operatively connected with the axles of said wheels to shift them longitudinally, a connection between said lever and shaft to oscillate the latter but permitting the lever to move beyond the limit of movement of said shaft whereby one movement of said lever causes the wheels to be shifted before the shovel-gangs are raised and the opposite movement causes the wheels to be shifted after the shovel-gangs are lowered, and means for independently adjusting the position of said gangs with relation to the position of said stop.

26. A machine of the cultivator type comprising a frame, a pair of shovel-gangs articulated thereto and resting on the ground when in use, a transverse shaft, connections between said shaft and shovel-gangs to raise or lower them when said shaft is oscillated, a pair of longitudinally-shiftable wheels mounted on said frame, a lever operatively connected with the axles of said wheels to shift them, a connection between said lever and shaft whereby said gangs are raised when said lever is operated to shift the wheels rearwardly and vice versa, means for limiting the downward movement of the respective shovel-gangs, and means for independently adjusting the position of each of said gangs with respect to said limiting means.

27. A machine of the cultivator type comprising a frame, a pair of longitudinally-shiftable wheels mounted thereon, a member operatively connected with the axles of said wheels for shifting them longitudinally and having a handle, a transverse shaft, a pair of lever-arms pivotally mounted thereon, a pair of shovel-gangs articulated to said frame and connected with said lever-arms to raise and lower said gangs, a connection between said member and said shaft for oscillating the latter when said wheels are shifted, a stop limiting the oscillation of said shaft without interfering with the further movement of said wheels, and means for adjustably securing said lever-arms at various angles on said shaft.

28. In a machine of the cultivator type, in combination with a horizontal transverse axle-arm and a shovel-gang rearwardly thereof, an articulation comprising a member 90 mounted to oscillate about said axle-arm as an axis and having a tubular pivot, a member 91 turning on one end of said pivot and secured to the front end of said shovel-gang, a member 97 hinged to said member 91 and turning on the other end of said pivot, and a pivot-pin passing through said tubular pivot and connecting the pivot ends of said members 91 and 97.

29. In a machine of the cultivator type, in combination with a horizontal transverse axle-arm and a shovel-gang rearwardly thereof, an articulation comprising a sleeve rotatably mounted on said axle-arm, a member 90 clamped to said sleeve and longitudinally adjustable thereon, vertical pivot-bearings carried by said member 90, a compound member secured to the front end of said shovel-gang comprising two parts hinged together and each having a pivot-bearing engaging one of the pivot-bearings of said member 90, and means for securing said parts together in pivotal engagement with said member 90.

30. In a machine of the cultivator type, in combination with a horizontal transverse axle-arm and a shovel-gang trailing rearwardly thereof, a universal joint connecting them and comprising a sleeve pivotally mounted on said axle-arm, a member 90 clamped to said sleeve and longitudinally adjustable thereon, a bracket-arm mounted on said member 90 and extending laterally, a member 91 pivoted on a vertical axis to said member 90, a connection between a point on said shovel-gang and said bracket-arm, and means for varying the effective length of said connection whereby said shovel-gang is given a lateral movement.

31. In a machine of the cultivator type, in combination with a horizontal transverse axle-arm and a shovel-gang trailing rearwardly thereof, a universal joint connecting them and comprising a sleeve rotatably mounted on said axle-arm, a member 90 clamped to said sleeve and longitudinally adjustable thereon, a member 91 connected to the front of said shovel-gang and pivoted to said member 90 on a vertical axis, a rock-arm on said shovel-gang, a bracket-arm extending laterally on said member 90, and a link connecting said rock-arm with said bracket-arm.

32. In a cultivator, the combination of an operating-shaft, a sector-arm non-rotatably mounted thereon, a hand-lever turning about the axis of said shaft and adjustably engaging said sector-arm, the hub of said hand-lever having a notched recess, and a member 66 non-rotatably fixed on said shaft and having a projection engaging said recess and abutting against the ends thereof to limit the turning movement of said hand-lever with respect to said shaft in either direction.

In witness whereof I have hereunto set my hand this 20th day of December, 1905.

EDWARD M. HEYLMAN.

In presence of—
F. H. FARNSWORTH,
R. C. PURCELL.